(No Model.)

W. CUTLER.
APPARATUS FOR BENDING AND SHAPING SHEET GLASS.

No. 544,248. Patented Aug. 6, 1895.

Witnesses.
G. W. Rea.
Robert Everett

Inventor.
William Cutler.
By James L. Norris.
Atty.

UNITED STATES PATENT OFFICE.

WILLIAM CUTLER, OF BIRMINGHAM, ENGLAND.

APPARATUS FOR BENDING AND SHAPING SHEET-GLASS.

SPECIFICATION forming part of Letters Patent No. 544,248, dated August 6, 1895.

Application filed February 7, 1895. Serial No. 637,632. (No model.) Patented in England December 8, 1894, No. 23,917.

*To all whom it may concern:*

Be it known that I, WILLIAM CUTLER, manufacturer, a subject of the Queen of Great Britain, residing at Cannon Works, Constitution Hill, Birmingham, in the county of Warwick, England, have invented new and useful Improvements in Apparatus for Bending and Shaping Sheet-Glass, (for which I have obtained a patent in Great Britain, No. 23,917, bearing date December 8, 1894,) of which the following is a specification.

The object of my invention is to effect improvements in means and appliances for bending and shaping sheet-glass.

Said invention consists in the novel construction and combination of parts hereinafter described and claimed.

I form the mold of cast-iron or other suitable metal. A flange is formed round the outer edge of the mold to receive the edges of the glass and support it in position while under treatment. At any convenient part or parts of the mold (according to the shape of the mold) I form one or more opening or openings or passages and fit the same with eduction-pipes for withdrawing the air from the mold and the under side of the glass.

In order to hold the glass firmly upon the flange of the mold a suitable frame is provided, which acts as a clip or weight to the outer edge of the glass, holding it in close contact with the flange of the mold.

The mold is heated in the ordinary manner in a bending kiln or oven. The glass to be shaped is fitted to the mold and held in position by the frame or clip. The air is then withdrawn from under the glass by means of an air-pump or other well-known means for forming a vacuum. The pressure of the atmosphere then acts upon the outer surface of the heated glass, bending the same to the shape of the mold.

My invention is applicable to all kinds of flat glass, such as plate, sheet, and crown glass.

In order that my said invention may be particularly described and ascertained reference is hereby made to the accompanying drawings, in which similar figures of reference indicate corresponding parts.

Figure 1:
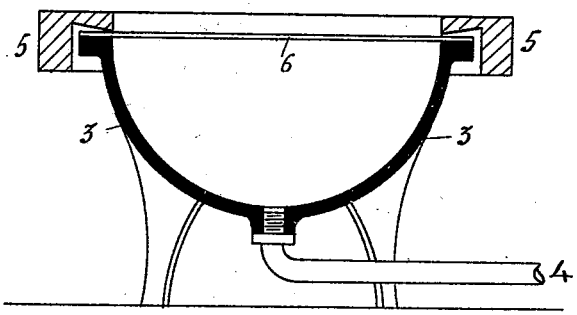
Figure 2:
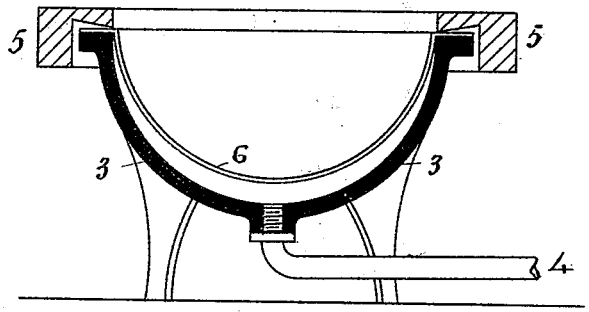

Figure 1 is a sectional elevation showing the apparatus previously to the operation of heating and bending the glass. Fig. 2 is a similar elevation of the apparatus, showing the method of operating upon the glass.

3 is the mold, which may be of any required form.

4 is the eduction-pipe, screwed to any convenient part of the mold, for exhausting the air from under the glass.

5 is a frame, which is made sufficiently heavy to hold the glass in position previously to and during the operation of heating and bending. The frame 5 may be further secured by means of clamps.

The glass 6 is placed in position, as shown in Fig. 1, with the frame resting upon it. The whole apparatus is then heated, and the air is withdrawn by the pipe 4, the heating process being continued until the glass assumes the required form.

I claim—

The combination in an apparatus for bending and shaping glass, of a mold on the outer edge of which the edges of the glass are supported, an eduction-pipe for exhausting air from the interior of the mold, and a weighted frame bearing against the edge portions of the glass and holding the same in close contact with the edge of the mold, substantially as and for the purposes described.

Dated January 10, 1895.

WILLIAM CUTLER.

Witnesses:
ERNEST HARKER,
ORLANDO E. POWER.